United States Patent
Byren et al.

(10) Patent No.: US 10,302,858 B2
(45) Date of Patent: May 28, 2019

(54) LOW-LATENCY, HOLLOW-CORE OPTICAL FIBER WITH TOTAL INTERNAL REFLECTION MODE CONFINEMENT

(71) Applicant: Raytheon Company, Waltham, MA (US)

(72) Inventors: Robert W. Byren, Manhattan Beach, CA (US); Vladimir V. Shkunov, San Pedro, CA (US)

(73) Assignee: RAYTHEON COMPANY, Waltham, MA (US)

( * ) Notice: Subject to any disclaimer, the term of this patent is extended or adjusted under 35 U.S.C. 154(b) by 195 days.

(21) Appl. No.: 14/042,913

(22) Filed: Oct. 1, 2013

(65) Prior Publication Data

US 2015/0093085 A1    Apr. 2, 2015

(51) Int. Cl.

| | |
|---|---|
| *G02B 6/02* | (2006.01) |
| *C03B 37/027* | (2006.01) |
| *C03B 37/012* | (2006.01) |
| *C03B 37/02* | (2006.01) |
| *C03B 37/026* | (2006.01) |

(52) U.S. Cl.
CPC ...... *G02B 6/02314* (2013.01); *C03B 37/0122* (2013.01); *C03B 37/01242* (2013.01); *C03B 37/02* (2013.01); *C03B 37/026* (2013.01); *C03B 37/02781* (2013.01); *G02B 6/02347* (2013.01); *C03B 2203/14* (2013.01); *C03B 2203/16* (2013.01); *C03B 2203/42* (2013.01); *C03B 2205/10* (2013.01); *G02B 6/02304* (2013.01); *G02B 6/02357* (2013.01)

(58) Field of Classification Search
None
See application file for complete search history.

(56) References Cited

U.S. PATENT DOCUMENTS

| | | | |
|---|---|---|---|
| 7,848,026 B2 * | 12/2010 | Chowdhury et al. | ......... 359/652 |
| 2012/0001075 A1 | 1/2012 | Frach et al. | |
| 2012/0115780 A1 | 5/2012 | Delaney et al. | |

(Continued)

FOREIGN PATENT DOCUMENTS

WO    2010127676 A1    11/2010

OTHER PUBLICATIONS

PCT/US2014/045941, Notification of Transmittal of the International Search Report and Written Opinion, dated Sep. 29, 2014.

(Continued)

*Primary Examiner* — Chris H Chu
(74) *Attorney, Agent, or Firm* — Lando & Anastasi, LLP (57) ABSTRACT

Air core optical fiber structures in which the cladding is composed of an engineered optical metamaterial having a refractive index less than unity for at least one specific wavelength band and provides for total internal reflection of optical energy between the air core and metamaterial cladding. According to certain examples, a method of guiding optical energy includes constructing a hollow core optical fiber with an all-dielectric optical metamaterial cladding, coupling optical energy into the optical fiber having an operating wavelength near a resonance of the metamaterial cladding, and guiding the optical energy within the hollow core optical fiber by total internal reflection.

10 Claims, 4 Drawing Sheets

(56) References Cited

U.S. PATENT DOCUMENTS

2016/0363726 A1* 12/2016 Alisafaee ............... G02B 1/007

OTHER PUBLICATIONS

Atakaramians, S., et al., "Hollow-Core Uniaxial Metamaterial Clad Fibers with Dispersive Metamaterials," J. Opt. Soc. Am., vol. 30, No. 4, Apr. 2013, pp. 851-867.
Yuan, J.H, et al., "Experimental Investigation of Hollow-Core Photonic Crystal Fibers with Five Photonic Band-Gaps," Optoelectronics Letters, vol. 4, No. 4, Jul. 1, 2008, pp. 0253-0256.
Jahani, S., et al., "Transformed Cladding Waveguides: Confining Light with All-Dielectric Metamaterials," Optical Society of America, CLEO:2013 Technical Digest, Jun. 9, 2013, pp. 1-2.
Kim, K.Y., "Fundamental Guided Electromagnetic Dispersion Characteristics in Lossless Dispersive Metamaterial Clad Circular Air-Hole Waveguides," Journal of Optics A: Pure and Applied Optics, vol. 9, No. 11, Nov. 1, 2007, pp. 1062-1069.
Namin, F., et al., "Near-Perfect Optical Mirrors Based on Thin All-Dielectric Zero Index Metamaterial Coatings," Antennas and Propagation (APSURSI), IEEE International Symposium on, Jul. 3, 2011, pp. 1155-1158.
Ahmadi, A., et al., "Physical Configuration and Performance modeling of All-Dielectric Metamaterials," Physical Review B 77, 045104, vol. 77, No. 4, Jan. 1, 2008, pp. 045104-1-045104-11.
Wu, C., et al., "All-Dielectric Metamaterials: Path to Low Losses and High Spectral Selectivity," Optical Society of America, CLEO:2013 Technical Digest, Jun. 9, 2013, pp. 1-2.
Valentine, J., et al., "All Dielectric Zero-Index Metamaterials at Optical Frequencies," Optoelectronic and Microelectronic Materials & Devices Conference on, IEEE, Dec. 12, 2012, pp. 107-108.

* cited by examiner

LOW-LATENCY, HOLLOW-CORE OPTICAL FIBER WITH TOTAL INTERNAL REFLECTION MODE CONFINEMENT

BACKGROUND

Optical fiber structures have traditionally been created using glass or plastic materials such that a cylindrical waveguide core of a particular material with a specific refractive index is surrounded by a cladding material of lower refractive index than the waveguide core. When optical energy propagating in the high refractive index waveguide core has an appropriate combination of wavelength and propagation angle, the energy can be totally reflected at the interface between the high refractive index waveguide core and low refractive index waveguide cladding. Such reflection within a high refractive index waveguide core is normally referred to as total internal reflection (TIR).

Traditionally, the materials utilized for the construction of optical fibers have been bulk materials, whose optical and electrical properties were intrinsic properties of the constituent elements. Manufacturing techniques for drawing fiber from preform structures has previously been limited to producing fibers having either smooth gradient refractive index distributions or simple step-wise radial refractive index distributions that were relatively constant in an azimuthal direction. Recent advances in optical fiber fabrication have allowed for the construction of more elaborate spatial refractive index distributions on the micro and nano scale in both radial and azimuthal directions with respect to the fiber axis.

Photonic crystal fibers are a class of micro-structured optical fiber in which an engineered periodic spatial distribution of materials provides for optical properties that are not present, or in some cases not possible, in the constituent bulk materials alone. Photonic crystal fibers have been designed to operate either through traditional index guiding methods, where a solid guiding core has a higher refractive index than the photonic crystal cladding, or on the principle of a photonic bandgap structure that confines optical propagation in a guided mode within the core through phase matched reflections of energy from multiple layers of material. Photonic crystal fibers can include these periodic variations in one dimension, such as in the concentric radial rings of a Bragg fiber, or in two dimensions, wherein a regular array of high refractive index or low refractive index longitudinal cylindrical (rod-like) structures is distributed through a bulk background material across the cross-sectional area of the fiber. These periodic index variations and geometric features have sizes on the same order of magnitude as the wavelength of optical energy being guided. In some cases, the low refractive index cylindrical structures may be constituted by holes formed from voids in the bulk background material. Based on the nature of a photonic bandgap that is created by a regular periodic array of high or low index structures, inclusion of a defect within the array of structures can allow for optical energy to be confined within such a defect. In some cases, the use of photonic bandgap effects can allow for light to be confined within a low refractive index core, optionally an air core, surrounded by material whose effective refractive index is of a higher value. While hollow core photonic crystal fibers avoid various optical nonlinearities that can occur at high power in solid core fibers and provide a method of fast optical communication relative to traditional solid core fibers, they generally produce optical propagation speeds that are much lower than free space optical communication due to the influence of the cladding's photonic bandgap structure on the propagating mode. Consequently, there exists a need for a hollow core optical waveguide that provides the low latency benefit associated with free space optical communications within an optical fiber structure.

SUMMARY OF INVENTION

Aspects and embodiments are directed to an air core optical fiber structure in which the cladding is composed of an engineered optical metamaterial having a refractive index less than unity for at least one specific wavelength band and provides for total internal reflection of optical energy between the air core and metamaterial cladding. Aspects and embodiments of the present invention provide for a hollow air core optical fiber with a metamaterial cladding having low latency and high optical propagation speed compared to legacy optical fiber designs.

According to one embodiment, an optical fiber waveguide structure comprises an all-dielectric optical metamaterial having subwavelength geometric features and a hollow core region surrounded by the cladding region and configured to guide optical energy within the hollow core region by total internal reflection. In one example of the optical fiber waveguide structure, the optical metamaterial has an effective refractive index less than unity at an operating wavelength of the optical fiber waveguide structure. In another embodiment, the optical metamaterial is comprised of a regularly spaced periodic array of features embedded within a bulk material. In some embodiments, the periodic array of features is configured in a hexagonal lattice pattern. In other embodiments, the periodic array of features is configured in a rectangular lattice pattern. In various embodiments, the optical metamaterial is comprised of a spatially varying array of features within a bulk material. In some embodiments, the spatially varying array of features is quasi-periodic. In various embodiments of the optical fiber waveguide structure, an optical mode supported at the operating wavelength is substantially located within the hollow core region. In some embodiments, the subwavelength geometric features are cylindrical in shape with circular cross section.

According to some embodiments, a method of guiding optical energy comprises constructing a hollow core optical fiber with an all-dielectric optical metamaterial cladding, coupling optical energy into the optical fiber having an operating wavelength near a resonance of the metamaterial cladding, and guiding the optical energy within the hollow core optical fiber by total internal reflection. In some embodiments, the method of guiding optical energy comprises having an effective refractive index of the metamaterial cladding at the operating wavelength that is less than unity. In various embodiments, the method further comprises guiding optical energy substantially within the hollow core of the optical fiber.

According to some embodiments, a method of manufacturing optical fiber comprises constructing a first optical fiber preform comprising glass rods having a first refractive index and arranged in a lattice pattern interspersed with glass substrate having a second refractive index, drawing the first optical fiber preform through a fiber draw process to produce a first optical fiber, dividing the first optical fiber into a plurality of first optical fiber segments, constructing a second optical fiber preform from an arrangement of the plurality of first optical fiber segments, and drawing the second optical fiber preform through a fiber draw process to produce a hollow core optical fiber with metamaterial cladding, the metamaterial cladding being formed from the arrangement of the plurality of first optical fiber segments. In some embodiments, the method of manufacturing optical fiber further comprises having the first refractive of higher value than the second refractive index. In other embodiments, the method of manufacturing optical fiber further comprises having the first refractive index of lower value than the second refractive index. In some embodiments, the method of manufacturing optical fiber further comprises constructing the second optical preform that includes arranging the hexagonal arrangement of first optical fiber segments such that the plurality of first optical fiber segments are excluded from at least one core lattice site in the arrangement of the plurality of first optical fiber segments.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

The propagation of optical energy through dielectric materials is normally associated with a latency compared to propagation of optical energy in free space. The index of refraction, or simply refractive index, of a material is a measure of the fractional change in the phase velocity of light when propagating through a medium. This index of refraction quantifies the amount by which electromagnetic oscillations are slowed down when propagating through a material as compared to free space propagation. The latency of propagation through an optical waveguide, such as a fiber-optic cable, is a significant factor in determining the limits at which information can be sent through an optical communications system. Whether communications occur over short distances, such as between computer processors and other electronic components on a motherboard, between processors within a datacenter, or over long distances, such as a long-haul telecommunications backbone, reducing the latency of optical transmission allows for faster processing of the information transmitted. Traditional designs of fiber optic cables having solid cores inherently suffer from latencies introduced by propagation through those solid core materials. More recent designs of hollow core photonic bandgap fibers also suffer from high latencies due to the nature of the light matter interaction associated with the Bragg effect used to confine optical energy within the fiber. As discussed in more detail below, aspects and embodiments are directed to structures and methods for the design and manufacture of a hollow core optical fiber incorporating a metamaterial cladding that provide capabilities for low latency optical communication.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Metamaterials are specially engineered structures that employ alternating variations of material properties, such as the relative electrical permittivity and relative magnetic permeability, in one, two or three dimensions on a scale much smaller than the wavelength of the energy interacting with the structure. In the radio frequency (RF) domain, metamaterial structures are typically metallic patterns that act as sub-wavelength sized microwave circuits, such as split-ring resonators, that control the phase velocity of the transmitted RF radiation and the effective RF impedance of the material. A material in which both the permeability and permittivity are negative is termed a "left handed" material; which is in contrast to an "ordinary" or "right handed" material. In the optical domain, similar geometric and material structures can be employed, but the scale size of the metamaterial is several orders of magnitude smaller in the nano-scale.

Plasmonic metamaterials that use metallic patterns or nano-structures allow for precise design and engineering of material properties, but tend to be very lossy at optical wavelengths due to dissipation of the surface plasmon currents induced by the electromagnetic field. In contrast, all-dielectric materials mitigate the losses associated with circulating currents in a metal while preserving the benefits of precision design and engineering of effective optical properties that meet the requirements of a particular application.

Due to the property that air has a refractive index that is near unity, just slightly larger than vacuum, hollow core fiber optic cables with claddings constructed from dielectric materials, having refractive indices greater than unity, have previously been limited to photonic crystal structures that guide optical energy based on a photonic bandgap effect. When guiding optical energy using a photonic bandgap cladding structure, the mechanism for producing reflection is a geometric effect based upon reflection from multiple layers of alternating material. As reflection of energy is based on the Bragg effect associated with photonic crystal structures, significant spatial interaction occurs between the optical energy propagating in the fiber and the photonic crystal cladding. This spatial interaction slows the group velocity of the light, and consequently increases the latency of information that is transmitted through the fiber.

The speed of light propagation through a material can be described by two separate quantities, phase velocity and group velocity. The phase velocity is the speed at which crests in the optical carrier advance in the medium. By contrast, the group velocity refers to the speed at which a modulation envelope, which is the portion that carries information, advances in the medium. Both phase and group velocity are dependent on the specific frequency of light, and are different for different frequencies due to dispersion and absorption resonances within the medium.

The phase velocity, $v_p$, is a function of the frequency of the oscillating optical field, $\omega$, and is defined by as $$v_p(\omega) = c/n(\omega) \quad (1)$$

where $n(\omega)$ is the frequency dependent refractive index of the medium, and c is the speed of light in vacuum. The phase velocity is responsible for the refractive properties of an optical system that behaves according to Snell's law of refraction and the Fresnel equations for reflected and refracted power at an interface between optical media with different refractive indices.

The group velocity, vg, is also a function of frequency and is defined as $$v_g(\omega) = \frac{c}{n(\omega) + \omega \frac{dn}{d\varrho}} \quad (2)$$

with $dn/d\omega$ defined as the index gradient or dispersion of the material. Consequently, the group velocity is a strong function of the dispersion of the medium, which is typically small.

When optical energy is propagating with a frequency that is near a material resonance of the system, the dispersion can become very large. A large dispersion can give rise to refractive indices that are less than 1, phase velocity greater than the speed of light in vacuum, negative refraction ($n(\omega)<0$), and other anomalous optical properties. The oscillations produced at these natural resonance frequencies are often strongly absorbing, dissipating the power of the optical field.

Absorption resonances can be illustrated by a harmonic oscillator model where the resonances represent the motion of negatively charged electrons that are bound to their positively charged nuclei resulting from interaction with the applied electromagnetic field. For a single resonance, the complex dielectric permittivity as a function of frequency can be represented as follows:

$$\varepsilon'(\omega) + i\varepsilon''(\omega) = n_{gl}^2 + \frac{iP}{1 - i(\omega - \omega_0)\Delta} \quad (3)$$

$$\varepsilon'(\omega) + i\varepsilon''(\omega) = n_{gl}^2 + P\left[\frac{-(\omega - \omega_0)/\Delta}{1 + (\omega - \omega_0)^2/\Delta^2} + \frac{i}{1 + (\omega - \omega_0)^2/\Delta^2}\right] \quad (4)$$

In the above equations, it is assumed that the absorption peak, centered at a frequency $\omega_0 = 2\pi c/\lambda$, appears on a background of a transparent dielectric medium with refractive index $n_{gl}$. There are two distinct parameters that are used to characterize the properties of the resonant response: P characterizes the peak strength of the resonance, and $\Delta$ characterizes the peak spectral half-width.

Figure 1:
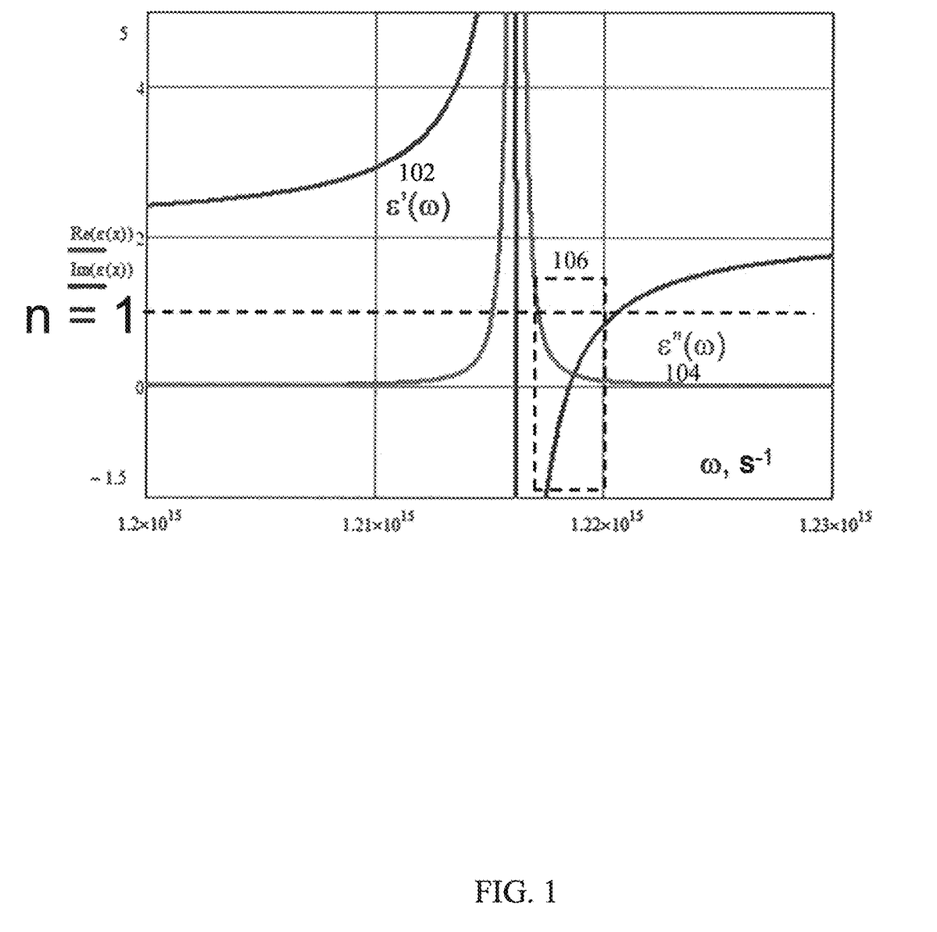
FIG. 1 is a typical plot of the real and imaginary parts of the electric permittivity for an all-dielectric polaritonic metamaterial.

FIG. 1 shows the graph of the dependencies of the real component of the dielectric permittivity, $\varepsilon'$ 102, and the imaginary component, $\varepsilon''$ 104, on optical frequency for an all-dielectric polaritonic metamaterial where the resonant frequency, $\omega_0$, is 1216 THz, corresponding to the typical optical fiber communication wavelength of 1.55 µm. The peak strength, P, has a value of 25 and the spectral half-width, $\Delta$, is 0.2 THz. On the high frequency side of the resonance, there exists a region 106 where the refractive index of the material is less than one, the slope of the dispersion curve $dn/d\omega$ is positive (outside of the anomalous dispersion region), and the loss is at a relatively low value. By appropriately designing the refractive index distribution of a metamaterial, a hollow core optical fiber structure can be produced having a high group velocity (low latency) and optical energy that is guided within the fiber's air core.

Figure 2:
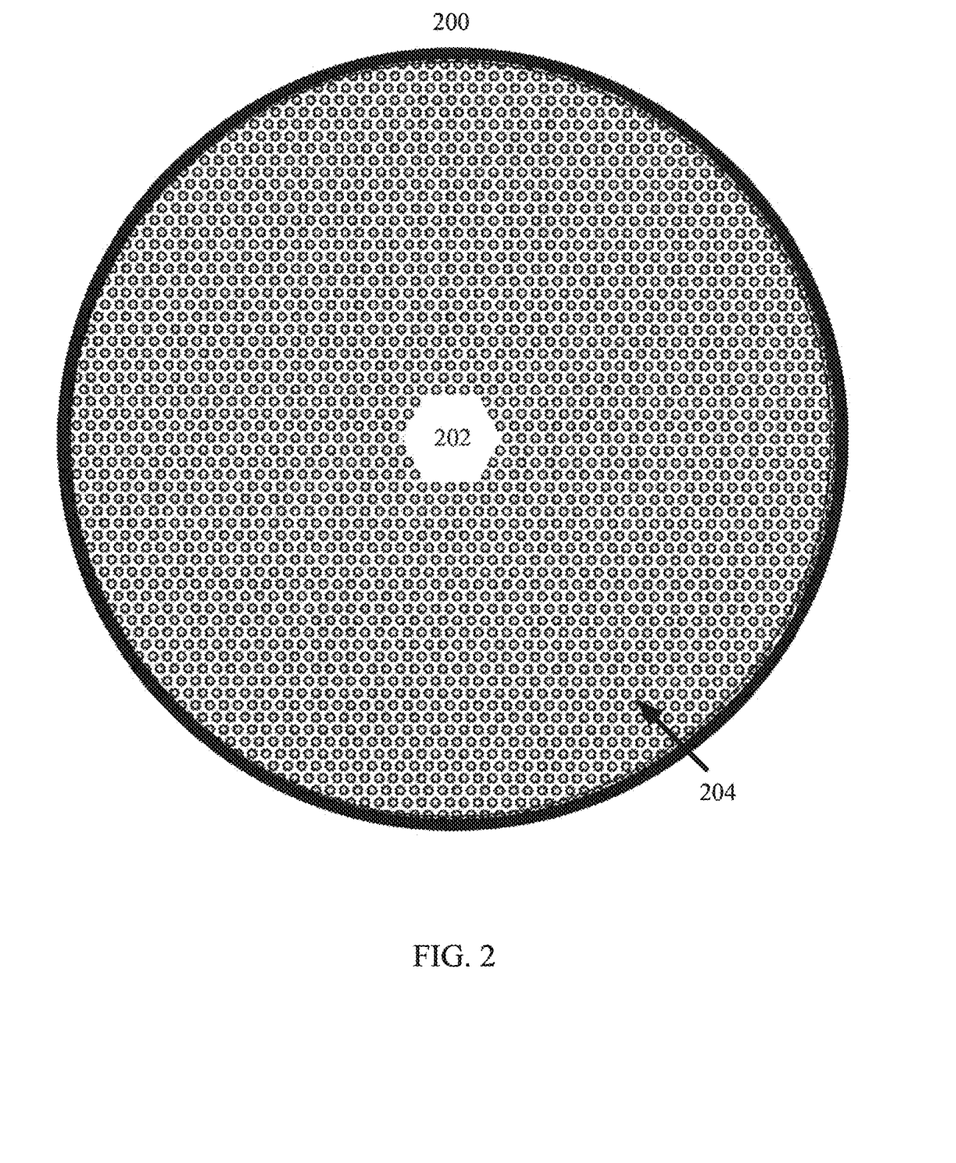
FIG. 2 is a schematic diagram of a cross section of an example of an optical fiber having an air core and a metamaterial cladding.

Referring to FIG. 2, there is illustrated an example of an optical fiber 200 having a hollow air core 202 surrounded by an optical metamaterial cladding 204. The metamaterial cladding comprises a higher index bulk optical material that is interspersed with lower index regions that have been engineered into the material. In some embodiments, the lower index regions may be air holes. The lower index regions may be of a subwavelength size and spacing to allow for the entire cladding region to be accurately described by an effective refractive index. In some embodiments, the proper design of the low index regions within the bulk material provides for the existence of resonance behavior of the bulk metamaterial. This resonance behavior of the bulk metamaterial is not associated with the Bragg resonances that are often present in photonic bandgap structures, but are a property of the bulk material, the effective refractive index of which has been altered through structuring as a metamaterial.

For a wavelength that is just to the high frequency side of the resonance in the metamaterial cladding 204, the refractive index of the cladding will be greater than zero and less than unity for a narrow spectral range. In this spectral range, optical energy within the fiber's air core may be totally internally reflected at the interface between the air core and the metamaterial. In some embodiments, the size of the air core relative to the metamaterial cladding may be optimized such that the majority of the propagating optical mode energy is supported within the fiber core and a minimal amount of mode energy is present as an evanescent tail in the metamaterial cladding. By minimizing the amount of energy present in the cladding, the effects of the cladding on the overall group velocity and loss of light can be minimized.

By proper selection of the signal wavelength, purity of the air medium in the core, numerical aperture of the core, and mode size of the confined beam, the hollow core waveguide with a metamaterial cladding may exhibit high phase velocity for confinement, acceptable group velocity (affecting only the evanescent portion of the beam), and acceptably low absorption and scattering loss. Such a configuration can support low-latency information transfer of over significant distances without the need for amplification.

Figure 3:
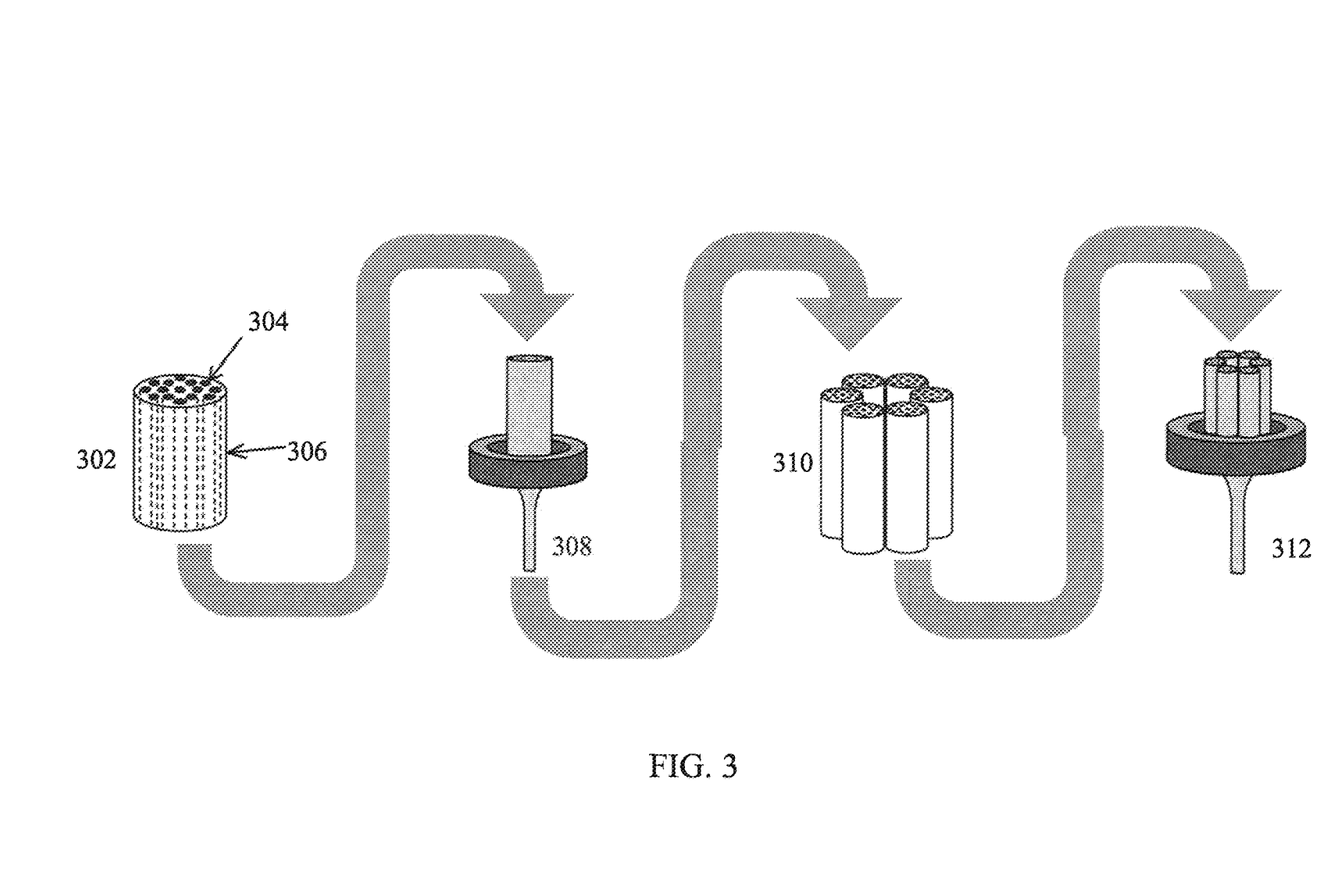
FIG. 3 is a diagram of one example of a manufacturing process and components used for creating an optical fiber with an air core and metamaterial cladding.
Figure 4:
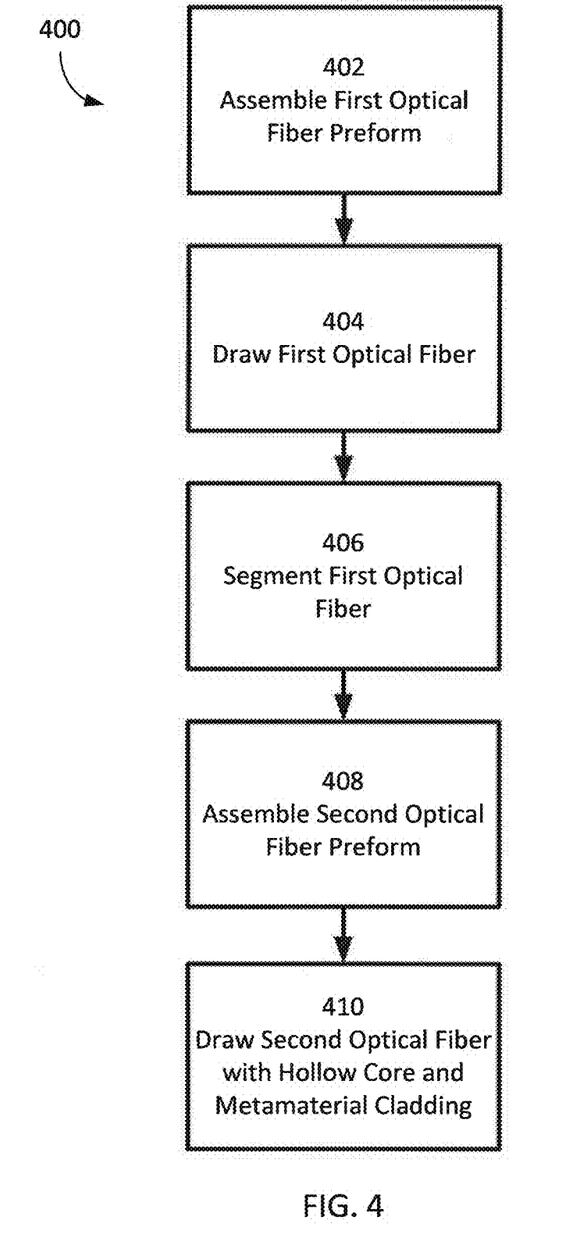
FIG. 4 is a flow diagram of one example of a manufacturing process used for creating an optical fiber with an air core and metamaterial cladding.

As shown in FIG. 3 and FIG. 4, the fabrication of an air core optical fiber with metamaterial cladding can be performed in a multistep process 400 that involves the creation of two sets of optical fiber configurations. In step 402, a first preform 302 is assembled that includes high index glass rods 304 and a lower index inclusions 306 acting as a substrate and arranged in a lattice pattern having a cross-section that is perpendicular to the resulting fiber axis. In some embodiments, the lattice of high index rods may be a regular hexagonal array, a rectangular array, or other spatial pattern. In some embodiments, the lattice of high index rods may have spatially varying separations, such as a quasi-periodic distribution of rods. In other embodiments, the lattice of low index inclusions can be air inclusions that arise from a void of material from the array of higher index rods. In some embodiments, the first preform 302 can be assembled from low index glass rods and high index inclusions acting as a substrate, where the rods are arranged in a lattice pattern having a cross-section that is perpendicular to the resulting fiber axis. In various embodiments, the matrix of low index rods may be a regular hexagonal array, a rectangular array, or other regularly shaped array. In particular embodiments, the matrix of low index rods may have spatially varying separations, such as a quasi-periodic distribution of rods or holes arranged in a lattice. In still other embodiments, the rod diameters may vary across the lattice pattern. In step 404, a first optical fiber 308 is produced by drawing the first preform 302 within a standard zone-heated fiber draw tower or other means. After completion of the first draw, in step 406, a set of first optical fiber segments having diameter of the order of several microns can be produced by segmenting the first optical fiber 308. In step 408, a second preform 310 is then fabricated from an assembly of first optical fiber segments 308. In step 410, a second fiber 312 is drawn from the same fiber draw tower using the second preform 310. In arranging the second preform 310, a hollow core is created by ensuring an appropriately designed void is present in the arrangement of first fibers in the lattice. Upon completion of the second draw through the fiber tower, the center hollow core can then have an appropriate numerical aperture to support single mode propagation with low mode loss, and the glass rods have a diameter and spacing, both subwavelength in size, to behave as a metamaterial. When designed appropriately, the metamaterial cladding can have an effective refractive index that is less than unity, thereby providing the required conditions for single-mode propagation and total internal reflection at the boundary between the air core and the metamaterial.

In some embodiments, the rods used within the preform may be hollow, and the preform may be fabricated using bonded glass capillaries. In this case, the hollow regions are subwavelength in diameter, and give rise to polaritonic resonance effects, but not Bragg diffraction. In further embodiments, the resulting second fiber 312 can be further processed to incorporate fine-patterned features on the outer surface of the cladding that act to modify and localize the electromagnetic properties of the rods. These additional fine-patterned features can be designed to produce polaritonic resonances and achieve the lower than unity refractive index required for total internal reflection in the air core fiber. Such fine-patterned features may be added by lithography, machined by a wet or dry etching process, or by other fabrication processing techniques.

Thus, aspects and embodiments provide an optical waveguide structure and method of guiding optical energy by which light can be confined within a hollow core optical fiber and propagated with low latencies that are close to that of optical propagation through free space. As discussed above, the incorporation of an optical metamaterial within the design of the optical fiber structure allows for the design of optical fiber cladding layers having refractive indices less than unity near polaritonic resonances for the metamaterial. Over narrow wavelength bands near these polaritonic resonances, optical energy can be guided within an hollow air core by total internal reflection, and consequently propagate with low latency close to that of free space communication. Through proper design of the polaritonic resonance of the metamaterial cladding, mechanisms for low latency information transfer can be created for applications in both short and long distance communications systems.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A low latency optical fiber waveguide structure comprising:
    a cladding region of an all-dielectric optical metamaterial, the all-dielectric optical metamaterial comprising a first dielectric bulk optical material having a first refractive index and a plurality of regions of a second dielectric material interspersed throughout the first dielectric bulk optical material, the second dielectric material having a second refractive index with a value that is lower than the first refractive index, the plurality of regions of the second dielectric material being of subwavelength size, being cylindrical in shape with circular cross-section, and arranged within the first dielectric bulk optical material such that the optical metamaterial exhibits resonance and has an effective refractive index that is greater than zero and less than unity at an operating wavelength of the optical fiber waveguide structure that is on a high-frequency side of the resonance of the optical metamaterial, wherein an outer surface of the cladding comprises fine-patterned features configured to modify and localize electromagnetic properties of the cladding region; and
    a hollow core region surrounded by the cladding region and configured to guide optical energy within the hollow core region by total internal reflection at an interface between the hollow core region and the cladding region, the optical energy having a phase velocity that is greater than the speed of light in a vacuum.

2. The low latency optical fiber waveguide structure of claim 1, wherein the plurality of regions of the second dielectric material are arranged as a regularly spaced periodic array of the regions of the second dielectric material embedded within the first dielectric bulk optical material.

3. The low latency optical fiber waveguide structure of claim 2, wherein the periodic array is configured in a hexagonal lattice pattern.

4. The low latency optical fiber waveguide structure of claim 2, wherein the periodic array is configured in a rectangular lattice pattern.

5. The low latency optical fiber waveguide structure of claim 1, wherein the plurality of regions of the second dielectric material are arranged as a spatially varying array of the regions of the second dielectric material within the first dielectric bulk optical material.

6. The low latency optical fiber waveguide structure of claim 5, wherein the spatially varying array of the plurality of regions of the second dielectric material is quasi-periodic.

7. The low latency optical fiber waveguide structure of claim 1, wherein an optical mode supported at the operating wavelength is substantially located within the hollow core region.

8. A method of guiding optical energy, the method comprising:
constructing a low-latency hollow core optical fiber with an all-dielectric optical metamaterial cladding, the all-dielectric optical metamaterial including a first dielectric bulk optical material having a first refractive index and a plurality of regions of a second dielectric material interspersed throughout the first dielectric bulk optical material, the second dielectric material having a second refractive index with a value that is lower than the first refractive index, the plurality of regions of the second dielectric material being of subwavelength size, being cylindrical in shape with circular cross-section, and arranged within the first dielectric bulk optical material such that the optical metamaterial exhibits resonance and has an effective refractive index that is greater than zero and less than unity at an operating wavelength of the optical fiber waveguide structure that is on a high-frequency side of the resonance of the optical metamaterial, wherein an outer surface of the cladding comprises fine-patterned features configured to modify and localize electromagnetic properties of the cladding region;
coupling optical energy into the optical fiber having the operating wavelength near the resonance of the metamaterial cladding; and
guiding the optical energy within the hollow core optical fiber by total internal reflection at an interface between the hollow core region and the cladding region, the optical energy having a phase velocity that is greater than the speed of light in a vacuum.

9. The low latency optical fiber waveguide structure of claim 1, wherein the first dielectric bulk optical material and the second dielectric material are glass materials.

10. The low latency optical fiber waveguide structure of claim 1, wherein the second dielectric material is air.

* * * * *